US012744978B2

(12) United States Patent
Moon et al.

(10) Patent No.: US 12,744,978 B2
(45) Date of Patent: Sep. 22, 2026

(54) CAMERA MODULE

(71) Applicant: LG INNOTEK CO., LTD., Seoul (KR)

(72) Inventors: Da Hin Moon, Seoul (KR); Sang Yeal Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 183 days.

(21) Appl. No.: 18/574,979

(22) PCT Filed: Jul. 1, 2022

(86) PCT No.: PCT/KR2022/009562
§ 371 (c)(1),
(2) Date: Dec. 28, 2023

(87) PCT Pub. No.: WO2023/277669
PCT Pub. Date: Jan. 5, 2023

(65) Prior Publication Data

US 2024/0348901 A1 Oct. 17, 2024

(30) Foreign Application Priority Data

Jul. 2, 2021 (KR) ........................ 10-2021-0087297

(51) Int. Cl.
*H04N 23/51* (2023.01)
*G03B 30/00* (2021.01)

(52) U.S. Cl.
CPC ............. *H04N 23/51* (2023.01); *G03B 30/00* (2021.01)

(58) Field of Classification Search
CPC ...................................................... H04N 23/52
See application file for complete search history.

(56) References Cited

U.S. PATENT DOCUMENTS 6,518,864 B1 2/2003 Ito et al.
2013/0083229 A1* 4/2013 Lin ...................... H10F 39/199 348/340

(Continued)

FOREIGN PATENT DOCUMENTS

CN 112333372 2/2021
EP 2136552 12/2009

(Continued)

OTHER PUBLICATIONS

International Search Report dated Oct. 7, 2022 issued in Application No. PCT/KR2022/009562.

(Continued)

*Primary Examiner* — Noam Reisner
(74) *Attorney, Agent, or Firm* — KED & ASSOCIATES, LLP

(57) ABSTRACT

A camera module comprises: a first body including a first ground part; a second body including a second ground part; a substrate disposed between the first body and the second body and including a hole; and an adhesive bonding the first body and the second body to each other, wherein: the first ground part comes into contact with a first plating layer disposed on one surface of the substrate; the second ground part comes into contact with a second plating layer disposed on the other surface of the substrate; and the first ground part is electrically connected to the second ground part by a connection part connecting the first plating layer to the second plating layer through the hole of the substrate.

15 Claims, 10 Drawing Sheets

(56) References Cited

U.S. PATENT DOCUMENTS

| | | | | |
|---|---|---|---|---|
| 2014/0132768 | A1* | 5/2014 | Choi | G03B 17/08<br>348/148 |
| 2015/0015778 | A1* | 1/2015 | Lee | H04N 23/57<br>348/373 |
| 2019/0028620 | A1 | 1/2019 | Park | |
| 2019/0208626 | A1* | 7/2019 | Han | H05K 1/028 |
| 2019/0302576 | A1* | 10/2019 | Rafalowski | B60S 1/026 |
| 2019/0373142 | A1 | 12/2019 | Fujiwara et al. | |
| 2020/0053258 | A1 | 2/2020 | Park et al. | |
| 2020/0292918 | A1 | 9/2020 | Park | |

FOREIGN PATENT DOCUMENTS

| | | |
|---|---|---|
| EP | 3346692 | 7/2018 |
| JP | 2005-229431 | 8/2005 |
| JP | 2010-041709 | 2/2010 |
| JP | 2018-098660 | 6/2018 |
| JP | 2020-518859 | 6/2020 |
| JP | 2020-134584 | 8/2020 |
| KR | 10-2016-0104316 | 9/2016 |
| KR | 10-2017-0027073 | 3/2017 |
| KR | 10-2017-0046371 | 5/2017 |
| KR | 10-2019-0004455 | 1/2019 |
| KR | 10-2019-0004457 | 1/2019 |
| KR | 10-2021-0057414 | 5/2021 |

OTHER PUBLICATIONS

European Search Report dated Apr. 28, 2025 issued in Application No. 22833722.6.

Chinese Office Action dated Apr. 16, 2026 issued in Application No. 202280047287.6.

Japanese Office Action dated Apr. 28, 2026 issued in Application No. 2024-500070.

Korean Office Action dated Jul. 8, 2026 issued in Application No. 10-2021-0087297.

* cited by examiner

CAMERA MODULE

CROSS-REFERENCE TO RELATED PATENT APPLICATIONS

This application is a U.S. National Stage Application under 35 U.S.C. § 371 of PCT Application No. PCT/KR2022/009562, filed Jul. 1, 2022, which claims priority to Korean Patent Application No. 10-2021-0087297, filed Jul. 2, 2021, whose entire disclosures are hereby incorporated by reference.

TECHNICAL FIELD

The present embodiment relates to a camera module.

BACKGROUND ART

Recently, a subminiature camera module has been developed, and the miniature camera module is widely used in small electronic products such as smart phones, laptop computers, and game consoles.

As the spread of automobiles has become popular, subminiature cameras are widely used not only in small electronic products but also in vehicles. For example, black box cameras for vehicle protection or objective data on traffic accidents, rear surveillance cameras enabling the driver to monitor blind spots at the rear of the vehicle through a screen to ensure safety when reversing the vehicle, ambient detection cameras capable of monitoring the surroundings of the vehicle, and the like are provided.

A camera may be provided with a lens, a lens holder for accommodating the lens, an image sensor for converting an image of a subject collected in the lens into an electrical signal, and a printed circuit board on which the image sensor is mounted. The housing that forms the external shape of the camera has an entirely sealed structure to prevent internal components from being contaminated by foreign substances containing moisture.

DETAILED DESCRIPTION OF THE INVENTION

Technical Subject

The present embodiment is intended to provide a camera module that can further enhance the electrical characteristics of the camera module by improving the structure and can firmly maintain the coupling state between the pluralities of bodies.

Technical Solution

A camera module according to the present embodiment comprises: a first body including a first ground part; a second body including a second ground part; a substrate being disposed between the first body and the second body and including a hole; and an adhesive for coupling the first body and the second body to each other, wherein the first ground part comes into contact with a first plating layer disposed on one surface of the substrate and the second ground part comes into contact with a second plating layer disposed on the other surface of the substrate, and wherein the first ground part is electrically connected to the second ground part by a connection part connecting the first plating layer to the second plating layer through the hole of the substrate.

The first body includes a groove, and the second body may include a protruded part coupled to the groove.

The connection part is disposed in the hole or on a side surface of the substrate so as to connect the first plating layer and the second plating layer.

The protruded part may become smaller in thickness as it travels upward.

The second ground part may include a plurality of protrusions being in contact with the lower surface of the substrate.

The first body includes a first guide being protruded downward, and the second body may include a second guide being protruded upward and coupled to the first guide.

The first guide includes a guide wall being protruded from the lower surface of the first body and a guide groove being disposed inside the guide wall, and the second guide may be coupled to the guide groove.

The printed circuit board may include an avoidance part so that the first guide or the second guide penetrates therethrough.

A camera module according to another embodiment comprises: a lens; a first body on which the lens is disposed; a second body being coupled to the first body; and an adhesive that couples the first body and the second body, wherein the first body includes a groove, wherein the second body includes a protruded part being coupled to the groove, and wherein the adhesive is disposed between the groove and the protruded part.

A camera module according to yet another embodiment comprises: a first body; a second body being coupled to the first body; a substrate being disposed between the first body and the second body; and an adhesive that couples the first body and the second body, wherein the first body includes a first ground part being electrically connected to the substrate, and wherein the first ground part includes a first unit ground plane, a second unit ground plane, and a gap separating the first unit ground plane and the second unit ground plane.

Advantageous Effects

Through the present embodiment, the first body, the second body, and the printed circuit board are electrically connected to form a ground area, thereby preventing the electromagnetic waves being generated in the circuit area of the printed circuit board from being radiated to the outside and affecting adjacent electronic components, or preventing the electromagnetic waves being generated externally from being introduced into the printed circuit board, so that the electrical characteristics of the camera module can be further improved, noise can be prevented from being included in the electrical signal, and excellent quality images can be obtained.

In addition, since the contact between the first ground part and the second ground part forms an area where the adhesive is disposed between the first body and the second body, there is an advantage in that the manufacturing process of the camera module becomes facilitated.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

The 'optical axis direction' used below is defined as the optical axis direction of the lens. Meanwhile, 'optical axis direction' may correspond to such as 'up and down direction', 'z-axis direction', and the like.

Hereinafter, the present invention will be described in more detail with reference to the attached drawings.

Figure 1:
FIG. 1 is a perspective view illustrating the external appearance of a camera module according to an embodiment of the present invention.
Figure 1:
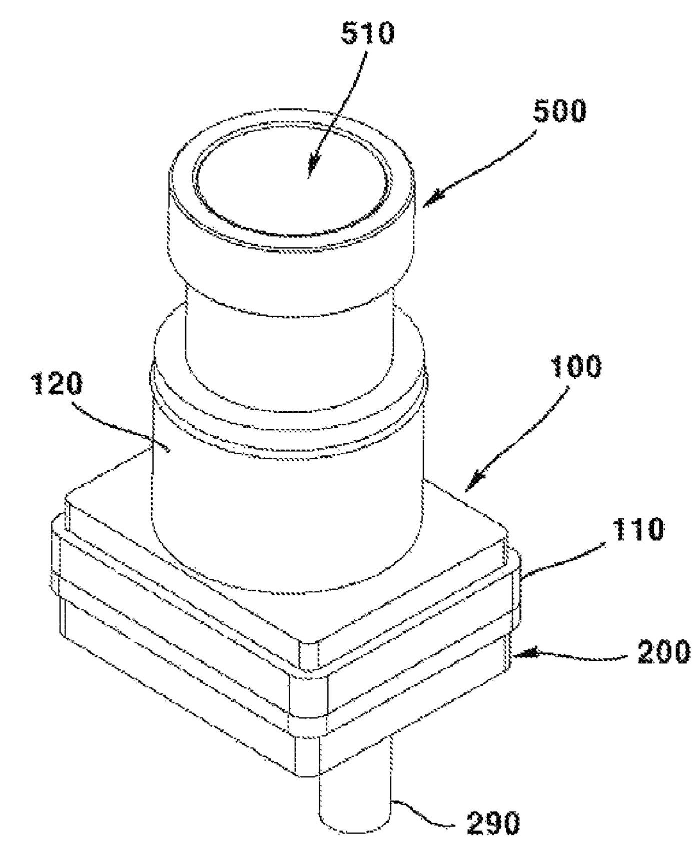
Figure 2:
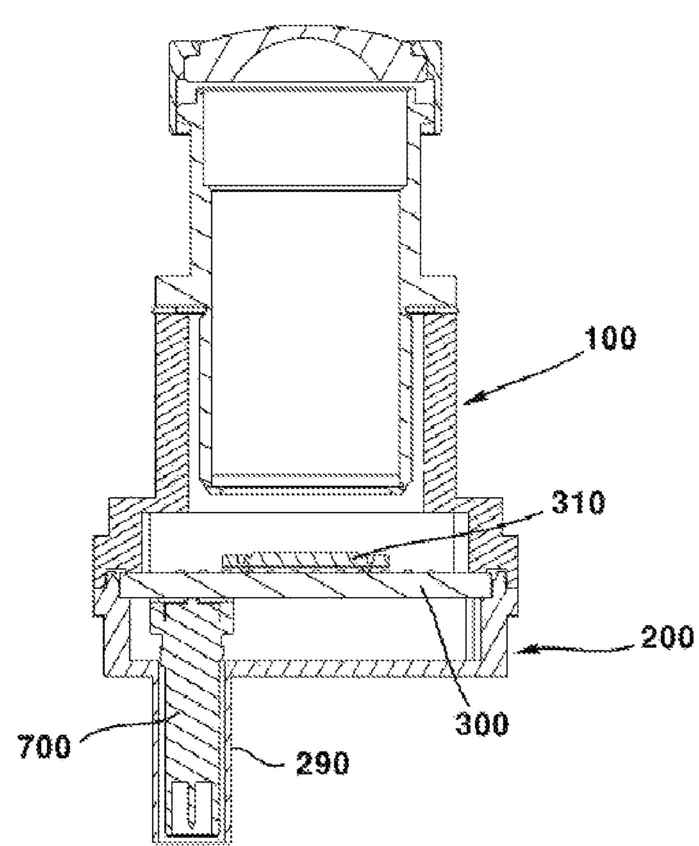
FIG. 2 is a cross-sectional view of a camera module according to an embodiment of the present invention.
Figure 3:
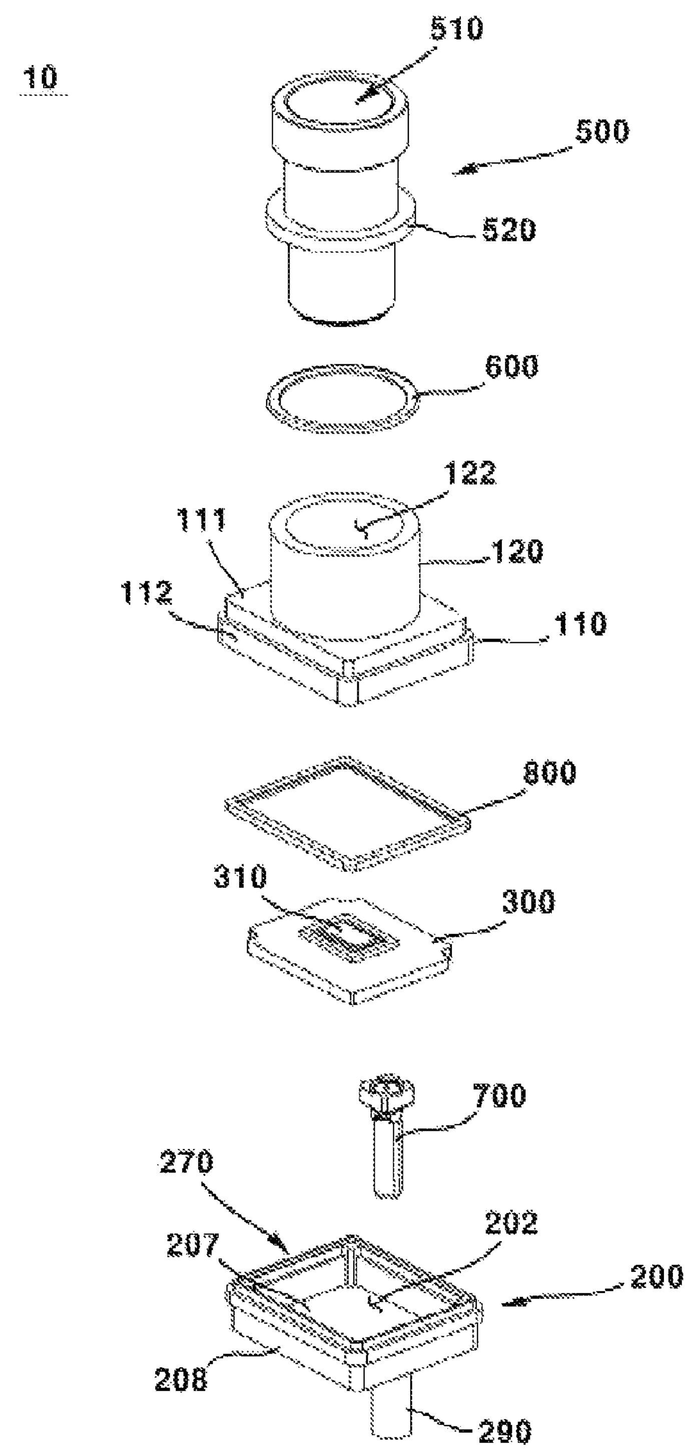
FIG. 3 is an exploded perspective view of a camera module according to an embodiment of the present invention.
Figure 4:
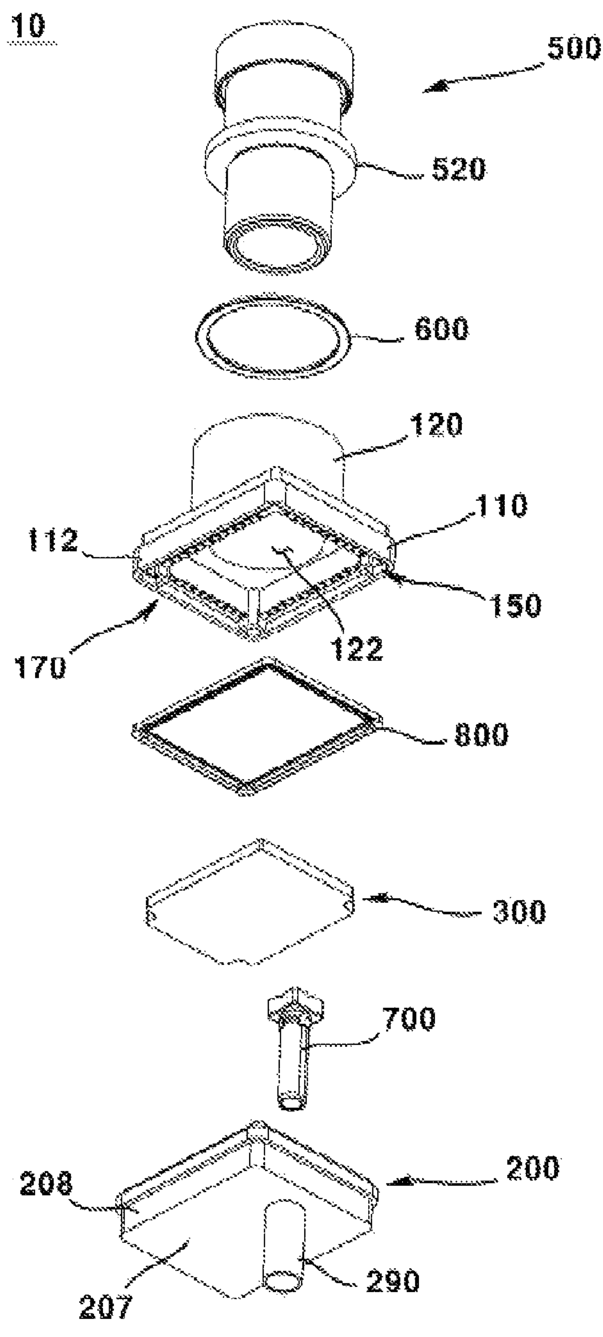
FIG. 4 is an exploded perspective view illustrating a camera module according to an embodiment of the present invention from another angle.
Figure 5:
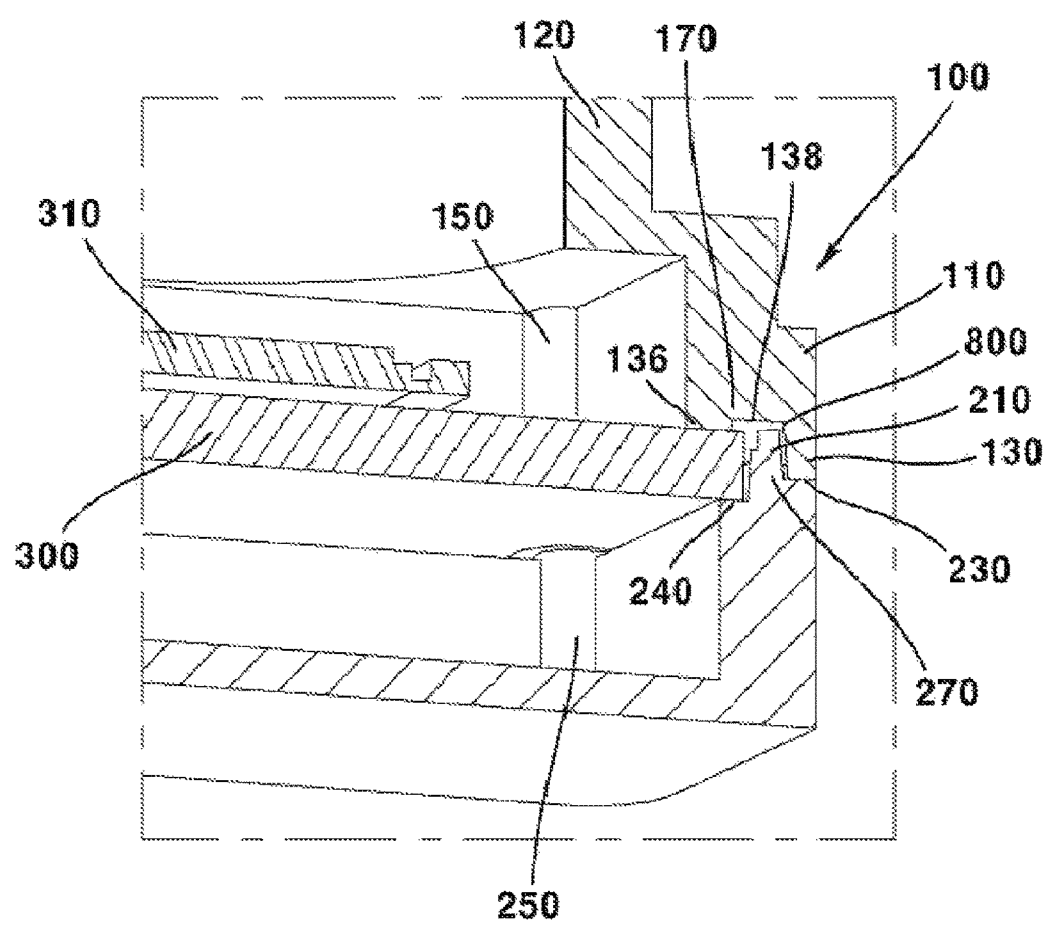
FIG. 5 is a perspective view illustrating a coupling structure of a first body and a second body according to an embodiment of the present invention.
Figure 6:
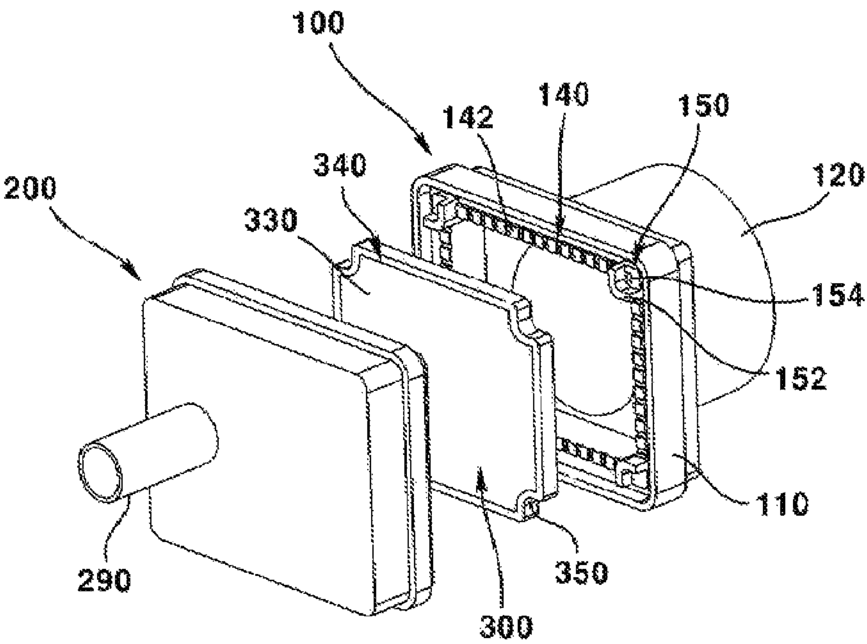
FIG. 6 is an exploded perspective view of a first body, a second body, and a printed circuit board according to an embodiment of the present invention.
Figure 7:
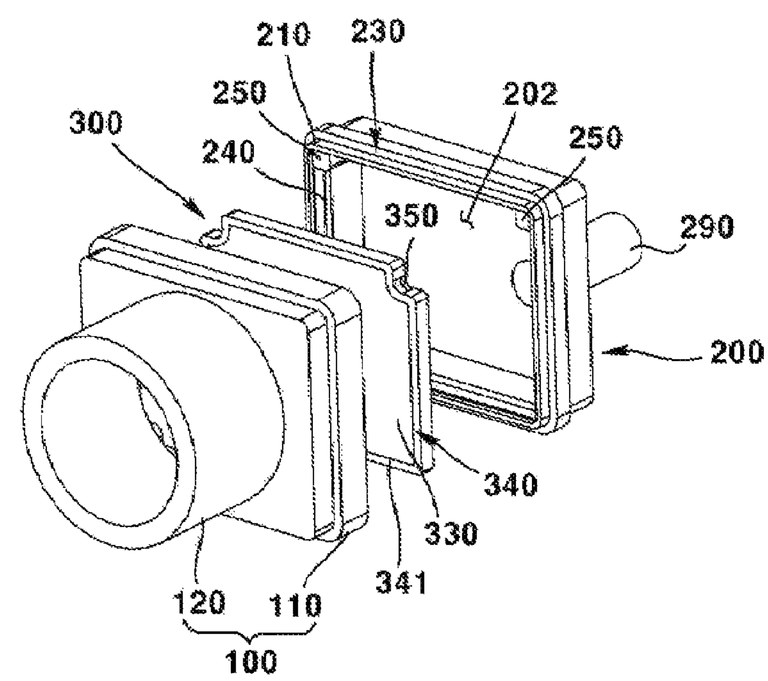
FIG. 7 is a view illustrating FIG. 6 from another angle.
Figure 8:
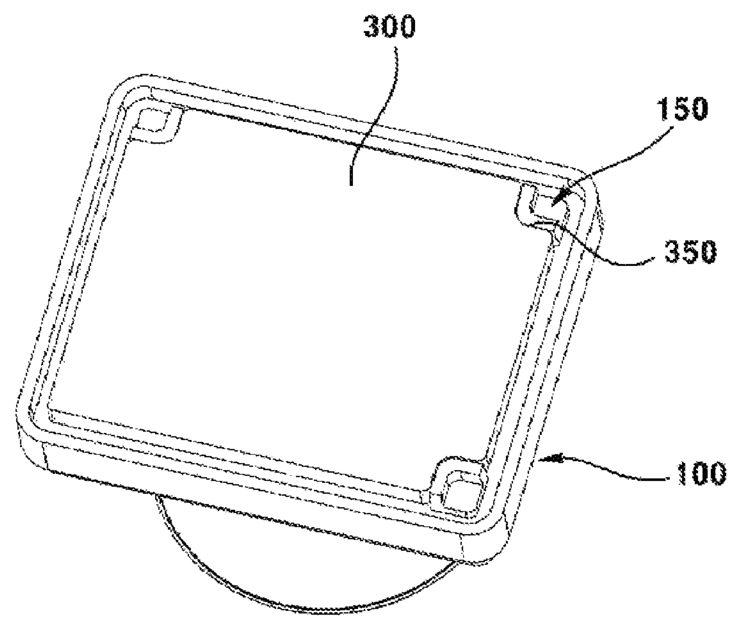
FIG. 8 is a perspective view illustrating a coupling structure between a first body and a printed circuit board according to an embodiment of the present invention.
Figure 9:
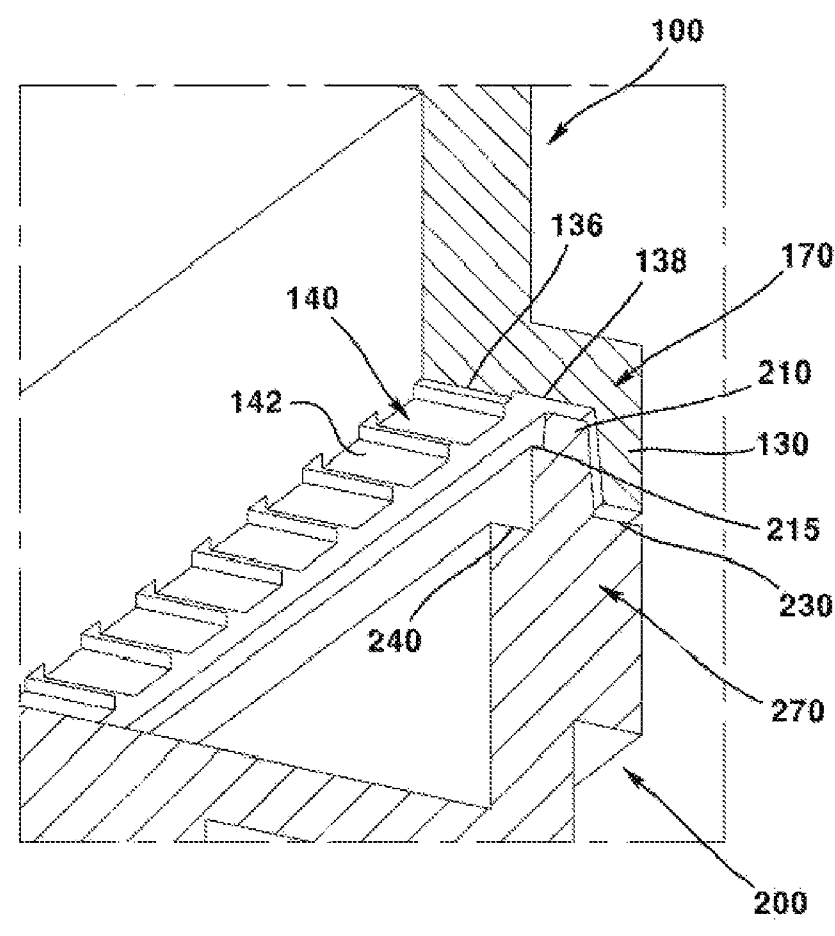
FIG. 9 is a perspective view illustrating the coupling structure of the first body and the second body excluding the adhesive according to an embodiment of the present invention.
Figure 10:
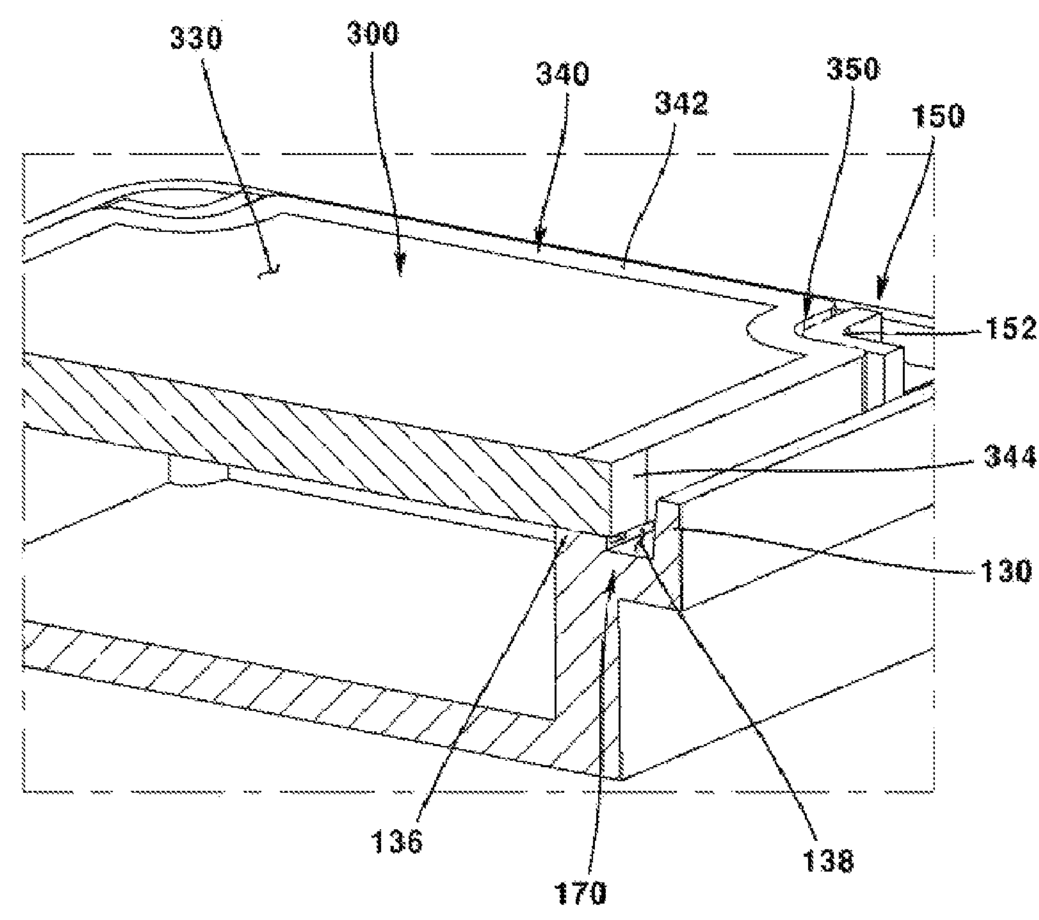
FIG. 10 is a perspective view illustrating a grounding structure of a printed circuit board and a first body according to an embodiment of the present invention.
Figure 11:
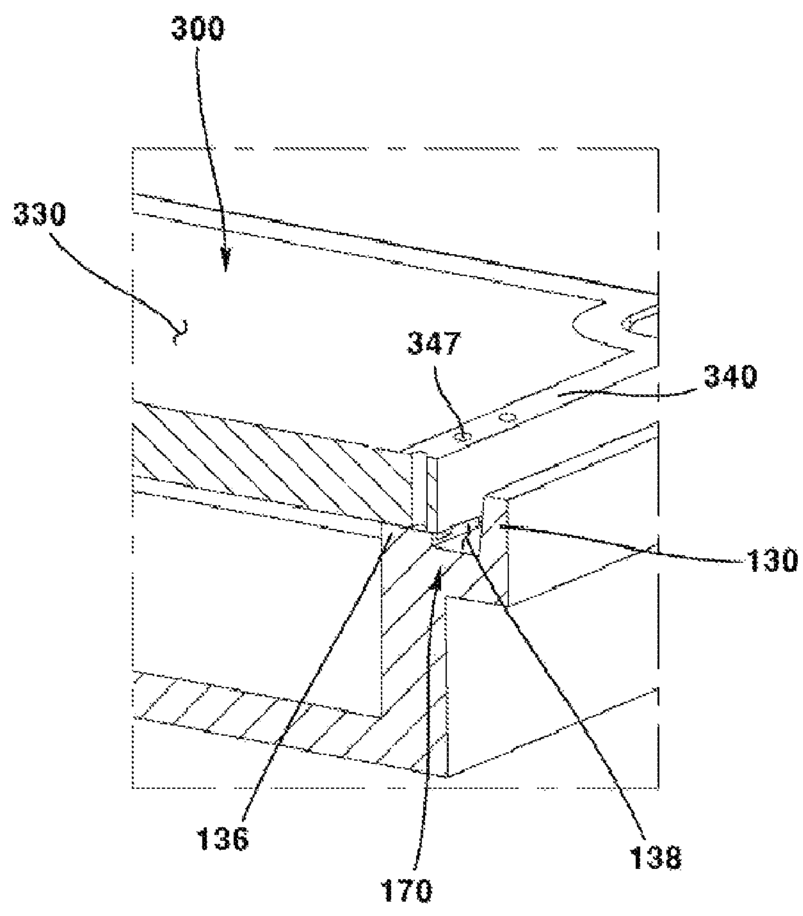
FIG. 11 is a diagram illustrating a modified embodiment of a grounding structure of the printed circuit board and the first body according to an embodiment of the present invention.

FIG. 1 is a perspective view illustrating the external appearance of a camera module according to an embodiment of the present invention; FIG. 2 is a cross-sectional view of a camera module according to an embodiment of the present invention; FIG. 3 is an exploded perspective view of a camera module according to an embodiment of the present invention; FIG. 4 is an exploded perspective view illustrating a camera module according to an embodiment of the present invention from another angle; FIG. 5 is a perspective view illustrating a coupling structure of a first body and a second body according to an embodiment of the present invention; FIG. 6 is an exploded perspective view of a first body, a second body, and a printed circuit board according to an embodiment of the present invention; FIG. 7 is a view illustrating FIG. 6 from another angle; FIG. 8 is a perspective view illustrating a coupling structure between a first body and a printed circuit board according to an embodiment of the present invention; FIG. 9 is a perspective view illustrating the coupling structure of the first body and the second body excluding the adhesive according to an embodiment of the present invention; FIG. 10 is a perspective view illustrating a grounding structure of a printed circuit board and a first body according to an embodiment of the present invention; and FIG. 11 is a diagram illustrating a modified embodiment of a grounding structure of the printed circuit board and the first body according to an embodiment of the present invention Referring to FIGS. 1 to 10, the camera module 10 according to an embodiment of the present invention may be a vehicle camera module. The camera module 10 may be coupled to a vehicle. The camera module 10 may be used in one or more among a vehicle's front camera, side camera, rear camera, and black box. The camera module 10 may be disposed in the front of the vehicle. The camera module 10 may be disposed at the rear of the vehicle. The camera module 10 may be coupled to the windshield of a vehicle. The camera module 10 may be coupled to the windshield at the front or rear of the vehicle. The camera module 10 may be disposed on the side of the vehicle. The camera module 10 can photograph a subject and output it as an image on a display (not illustrated).

The camera module 10 may include a first body 100. The first body 100 may be referred to as one among a front body, an upper housing, and a first housing. The first body 100 may include a body part 110. The first body 100 may include a barrel part 120. The first body 100 may include a lens 500. The body part 110, barrel part 120, and lens 500 of the first body 100 may be formed as one body. Any two or more of the body part 110, barrel part 120, and lens 500 of the first body 100 may be formed integrally. As a modified embodiment, the body part 110, barrel part 120, and lens 500 may be formed separately.

The body part 110 may be coupled to the barrel part 120. The body part 110 may be formed integrally with the barrel part 120. The body part 110 may be made of a metal material. The body part 110 may be disposed above the second body 200, which will be described later. The body part 110 may be coupled to the second body 200. The lower end of the body part 110 may be fixed to the second body 200. The body part 110 may be coupled to the second body 200 by an adhesive. The body part 110 may be coupled with the substrate 300, which will be described later.

The body part 110 may be formed in a rectangular shape with an open lower portion. At this time, the corners of the body part 110 may be formed to be rounded. The body part 110 may include an upper plate 111 and a first side plate 112 being extended from the upper plate 111. The upper plate 111 may be formed in a rectangular shape. The upper plate 111 may be extended outward from the lower outer circumferential surface of the barrel part 120. The first side plate 112 may be extended downward from the outer edge of the upper plate 111. The first side plate 112 may be provided in plural numbers. The first side plate 112 may include four side plates. The first side plate 112 may be formed in a rectangular plate shape. The first side plate 112 may include a first-first side plate, a first-second side plate, a first-third side plate being disposed at an opposite side of the first-first side plate, and a first-fourth side plate being disposed at an opposite side of the first-second side plate. The first side plate 112 may include first to fourth corners being respectively disposed between the first-first side plate and the first-fourth side plate. Each of the first to fourth corners may have a round shape at least in part.

A space portion partitioned from other areas may be formed inside the body part 110. The lower portion of the space portion is open, and the upper portion may be covered through the barrel part 120 and the lower surface of the lens 500.

The body part 110 may include a first edge area 170. The first edge area 170 may be disposed outside the space portion. The first edge area 170 may form the lower surface of the body part 110.

The first edge area 170 may include a first protruded part 130, a second protruded part 136, and a first groove 138. With respect to the center of the body part 110, the second protruded part 136 is disposed inside the first protruded part 130, and a first groove 138 can be disposed between the first protruded part 130 and the second protruded part 136. Here, the first groove 138 may be a space being formed between the first protruded part 130 and the second protruded part 136.

The first protruded part 130 may be formed to be protruded downward from the lower surface of the body part 110 more than other areas. The lower end of the first protruded part 130 may be protruded more downward from the upper surface of the substrate 300. The lower end of the first protruded part 130 may be protruded more downward than the lower end of the second protruded part 136.

An inclined surface may be formed on the inner surface of the first protruded part 130 in a shape in which the thickness of the first protruded part 130 becomes thinner as it travels downward. Here, the thickness of the first protruded part 130 may be a length defined in a direction perpendicular to the optical axis direction The second protruded part 136 may be disposed inside the first protruded part 130. The lower surface of the second protruded part 136 may be defined as the lower surface of the first body 100. The lower surface of the second protruded part 136 may be in contact with the upper surface of the substrate 300. In other words, the lower surface of the first body 100, that is, the lower surface of the body part 110, may be in contact with the upper surface of the substrate 300. The lower end of the second protruded part 136 may be disposed higher than the lower end of the first protruded part 130.

A first ground part 140 being protruded more downward than other areas may be disposed on the lower surface of the second protruded part 136. The first ground part 140 (see FIG. 9) includes a plurality of protrusions 142, and the plurality of protrusions 142 may be disposed to be spaced apart from one another on the lower surface of the first body 100. The lower surface of the first ground part 140 may be in contact with the upper surface of the substrate 300. That is, the lower surfaces of the multiple protrusions 142 may be in contact with the upper surface of the substrate 300.

Since a plurality of protrusions 142 are provided, the first ground part 140 may include a first unit ground plane and a second unit ground plane being electrically connected to the substrate 300. The first unit ground plane is disposed on the lower surface of one protrusion 142 among pluralities of protrusions 142, and the second unit ground plane may be disposed on the lower surface of another protrusion 142 among the pluralities of protrusions 142. A gap may be disposed between the first unit ground plane and the second unit ground plane to separate the first unit ground plane and the second unit ground plane from each other. The gap may be a groove that being depressed more upward than the lower surface of the protrusion 142. Here, the gap may be an area where pluralities of protrusions 142 are formed to be spaced apart from one another. The adhesive 800, which will be described later, may be disposed inside the gap.

Meanwhile, the number of unit ground planes of the first ground part 140 may be N, and accordingly, the number of gaps being disposed between adjacent protrusions 142 may be N−1.

Among the outer surfaces of the first body 100, areas excluding the lower surface of the first ground part 140 and the upper surface of the second ground part 240, which will be described later, may be treated with coating. Accordingly, the metal area of the first body 100 may be exposed to the outside through the lower surface of the first ground part 140 and the upper surface of the second ground part 240.

The first groove 138 may be disposed between the first protruded part 130 and the second protruded part 136. The first groove 138 may be defined as an inner space being disposed between the first protruded part 130 and the second protruded part 136. The first groove 138 may be formed to be recessed more upward than the lower end of the first protruded part 130 and the lower end of the second protruded part 136. The bottom surface of the first groove 138 may be disposed more above than the lower end of the first protruded part 130 and the lower end of the second protruded part 136. The bottom surface of the first groove 138 may be disposed at an upper side of the upper surface of the substrate 300.

The first groove 138 may be referred to as a groove 138.

Meanwhile, the first protruded part 130 and the second protruded part 136 may be referred to as a first side wall and a second side wall, respectively, in that they form an area where the groove 138 is disposed inside thereof.

The first body 100 may include a barrel part 120. The barrel part 120 may be a lens barrel. The barrel part 120 may be formed of a metal material. The barrel part 120 may be disposed in the body part 110. The barrel part 120 may be extended from the upper surface of the body part 110. The barrel part 120 may be formed integrally with the body part 110. In a modified embodiment, the barrel part 120 may be coupled to the body part 110. In this case, the barrel part 120 may be fixed to the body part 110 by an adhesive. The barrel part 120 can accommodate the lens 500 therein. The barrel part 120 may include a hole 122. A lens 500 may be disposed in the hole 122 of the barrel part 120. The inner circumferential surface of the hole of the barrel part 120 may be formed in a shape and size corresponding to the outer circumferential shape of the lens 500.

The first body 100 may include a first guide 150. The first guide 150 may be formed to be protruded downward from the lower surface of the first body 100. The first guide 150 may be disposed on the lower surface of the body part 110. The body part 110 may be disposed inside the first side plate 112. The first guide 150 may be disposed in a corner area of the lower surface of the body part 110. For example, three first guides 150 may be provided and each may be disposed in three corner areas among four corner areas disposed on the lower surface of the body part 110. The first guide 150 is a component being used to align the direction and position of the substrate 300 when coupling the first body 100 and the substrate 300, and is disposed only in three corner areas among four corner areas so that the substrate 300 can be prevented from being inserted in a reverse direction or coupled in a different direction.

The first guide 150 may include a guide wall 152 and a guide groove 154 being disposed inside the guide wall 152. The guide wall 152 is protruded downward from the lower surface of the body part 110 and can partition the guide groove 154 from other areas. The guide wall 152 may have an approximately "L" or "inverted-L" shape in cross section. The guide wall 152 may be disposed between the corner area of the body part 110 and the first ground part 140.

The guide groove 154 is disposed inside the guide wall 152 and may have a groove shape. The bottom surface of the guide groove 154 may be formed at the same height as the lower surface of the second protruded part 136 or the bottom surface of the first groove 138.

The first body 100 may include a lens 500. The lens 500 may be disposed in the barrel part 120. The lens 500 may be coupled to barrel part 120. The lens 500 may be disposed in the hole 122 of the barrel part 120. The lens 500 may include a plurality of lenses 510. The plurality of lenses 510 may be accommodated inside the barrel. The lens 500 may be aligned with an image sensor, which will be described later. The optical axis may be aligned with the image sensor of the lens 500. The optical axis of the lens 500 may coincide with the optical axis of the image sensor. The first body 100 may include an infrared filter (IR filter) being disposed between the lens 500 and the image sensor.

A protruding area 520 being protruded outward may be disposed on the outer surface of the lens 500. When the lens 500 and the first body 100 are coupled, the protruding area 520 may be disposed on the upper surface of the barrel part 120. In order to prevent foreign substances from entering the space inside the first body 100, a sealing member 600 may be disposed between the lower surface of the protruding area 520 and the upper surface of the barrel part 120.

The camera module 10 may include a second body 200. The second body 200 may be referred to as one among a rear body, a lower housing, and a second housing. The second body 200 may be formed in a rectangular shape with an open upper portion. The second body 200 may be formed of a metal material. The second body 200 may be disposed below the first body 100. The second body 200 may be coupled with the first body 100. The second body 200 may form an internal space through the coupling with the first body 100. The second body 200 may include a space portion 202 whose upper surface is open.

The second body 200 may include a bottom plate 207. The bottom plate 207 may face the upper plate 111 of the body part 110 of the first body 100. The bottom plate 207 may be spaced apart from the upper plate 111 of the body part 110 of the first body 100 in an optical axis direction. The bottom plate 207 may be parallel to the upper plate 111 of the body part 110 of the first body 110. The bottom plate 207 may be formed in a rectangular shape. At this time, the corners of the bottom plate 207 may have a round shape at least in part.

The second body 200 may include a second side plate 208. The second side plate 208 may be extended from the bottom plate 207. The second side plate 208 may be extended from the outer edge of the bottom plate 207. A shield can (not illustrated) may be disposed on the second side plate 208. The shield can may be in surface contact with the inner surface of the second side plate 208. The upper end of the second side plate 208 may be coupled to the first body 100. The outer surface of the second side plate 208 may be disposed on the same plane as the outer surface of the first side plate 112 of the first body 100.

The second body 200 may include a connector lead-out portion 290. The connector lead-out portion 290 may be coupled to the bottom plate 207. The connector lead-out portion 290 may be disposed in a hole (not illustrated) of the bottom plate 207. The connector lead-out portion 290 may penetrate the hole of the bottom plate 207. The connector 500 may be disposed inside the connector lead-out portion 290. The connector lead-out portion 290 may be formed of a metal material.

The second body 200 may include a second edge area 270. The second edge area 270 may be disposed outside the space portion 202. The second edge area 270 may be formed on the upper surface of the second side plate 208. The second edge area 270 may form the upper edge of the second body 200. The second edge area 270 may be disposed to face the first edge area 170 in an optical axis direction.

When the first body 100 and the second body 200 are coupled, at least a portion of the first edge area 170 and the second edge area 270 may be disposed to be spaced apart in an optical axis direction. When the first body 100 and the second body 200 are coupled, an adhesive accommodating portion that accommodates an adhesive 800, which will be described later, may be formed between the first edge area 170 and the second edge area 270.

With respect to the third protruded part 210, the second edge area 270 may include a second groove 230 being disposed at an outer side of the third protruded part 210 and a third groove 240 being disposed at an inner side of the third protruded part 210. With respect to an optical axis direction, the first protruded part 130 and the second groove 230 are disposed to face each other, the second protruded part 136 and the third groove 240 are disposed to face each other, and the first groove 138 may be disposed to face the third protruded part 210.

The third protruded part 210 may be formed to be protruded upward from the upper surface of the second body 200. The third protruded part 210 may be formed to be protruded upward from the upper surface of the second side plate 208. At least a portion of the third protruded part 210 may be disposed inside the first groove 138. With respect to the direction perpendicular to the optical axis direction, the third protruded part 210 may be disposed to be at least partially overlapped with the first protruded part 130 or the second protruded part 136. The upper end of the third protruded part 210 may be disposed above the bottom surface of the second groove 230 or the bottom surface of the third groove 240.

As illustrated in FIG. 5, the thickness of the third protruded part 210 may become smaller as it travels upward. The width of the end of the third protruded part 210 being protruded upward may be smaller than the width of the lower end. Additionally, the third protruded part 210 may include an area whose width becomes narrower as it travels towards the end. Through this shape, areas spaced apart from each other are formed through the inclined surface formed on the inner surface of the first protruded part 130 and the inclined surface formed on the outer surface of the third protruded part 210, and an adhesive 800, which will be described later, may be disposed in the area being spaced apart.

A groove area 215 (refer to FIG. 9) may be formed on the inner surface of the third protruded part 210 in a shape that is recessed more outward than other areas. The groove area 215 may be disposed adjacent to the upper end of the third protruded part 210. Through the groove area 215, the arrangement area of the adhesive 800, which will be described later, can be formed to be wider between the first edge area 170 and the second edge area 270. A step may be formed on one side of the third protruded part 210 by the groove area 215.

Meanwhile, one or more stepped or inclined areas to form a wider adhesive 800 placement area can also be formed on an inner surface of the first protruded part 130 or an outer surface of the second protruded part 136 inside the first body 100 corresponding to the step area of the third protruded part 210.

The second groove 230 may be disposed outside the third protruded part 210. The bottom surface of the second groove 230 may be disposed lower than the upper surface of the third protruded part 210. The bottom surface of the second groove 230 may be disposed above the bottom surface of the third groove 240. The first protruded part 130 may be coupled to the second groove 230. The bottom surface of the second groove 230 may be in contact with the lower surface of the first protruded part 130, but unlike this, the bottom surface of the second groove 230 and the lower surface of the first protruded part 130 may be spaced apart in an optical axis direction.

The third groove 240 may be disposed inside the third protruded part 210. The bottom surface of the third groove 240 may be disposed lower than the upper surface of the third protruded part 210 and the bottom surface of the second groove 230. The third groove 240 may be defined as the upper surface of the second body 200. The bottom surface of the third groove 240 may be in contact with the lower surface of the substrate 300. In other words, the upper surface of the second body 200 may be contact with the lower surface of the substrate 300. That is, the upper surface of the second side plate 208 may be in contact with the lower surface of the substrate 300. Accordingly, the upper surface of the substrate 300 may be in contact with the lower surface of the first body 100, and the lower surface of the substrate 300 may be in contact with the upper surface of the second body 200.

A second ground part 240 may be formed on the bottom surface of the third groove 240, that is, on the upper surface of the second body 200 being in contact with the lower surface of the substrate 300. In the present specification, the second ground part 240 is defined as the bottom surface of the third groove 240, and therefore is assigned the same reference numeral. The second ground part 240 may include a plurality of protrusions (not illustrated), and the plurality of protrusions may be disposed to be spaced apart from one another. The number of protrusions inside the second ground part 240 may be different from the number of protrusions inside the first ground part 140. For example, the number of protrusions being disposed on the upper surface of the second ground part 240 may be smaller than the number of protrusions being disposed on the lower surface of the first ground part 140. Unlike this, the second ground part 240 may be a flat horizontal surface.

The second body 200 may include a second guide 250. The second guide 250 may be formed to be protruded upward from the upper surface of the second body 200. The second guide 250 may be disposed inside the second side plate 208. The second guide 250 may be disposed in a corner area of the second body 200. The second guide 250 may be disposed to face the first guide 150 in an optical axis direction. For example, three second guides 250 may be provided and each may be disposed in three of four corner areas being disposed on the upper surface of the second body 200.

The second guide 250 may be coupled to the guide groove 154 of the first guide 150. The cross-sectional shape of the second guide 250 may be formed to correspond to the cross-sectional shape of the guide groove 154. The upper surface of the second guide 250 may be in contact with the bottom surface of the guide groove 154. Some of the side surfaces of the second guide 250 may be in contact with the inner surface of the guide wall 152.

The lower surface of the second guide 250 may be disposed above the bottom surface of the third groove 240.

The camera module 10 may include a substrate 300. The substrate 300 may be a printed circuit board. The substrate 300 may be disposed between the first body 100 and the second body 200. The substrate 300 may be disposed to be overlapped with the first edge area 170 or the second edge area 270 in a direction perpendicular to the optical axis.

An image sensor (not illustrated) may be disposed on the upper surface of the substrate 300. A connector 700 may be coupled to the lower surface of the substrate 300. The substrate 300 may be electrically connected to the connector 700.

The substrate 300 may include a circuit area 330 on which a circuit pattern is formed and a plating layer 340 on which a circuit pattern is not formed. A circuit pattern is formed in the circuit area 330, and at least one electronic component may be mounted on the surface. The image sensor 310 may be disposed in the circuit area 330.

The plating layer 340 may be disposed along the edge of the substrate 300. The plating layer 340 may be a ground area where the copper foil of the substrate 300 is exposed. The plating layer 340 may be an area where metal is exposed on the outer surface of the substrate 300. The plating layer 340 may also be referred to as a ground area. The plating layer 340 may be in contact with the first body 100 or the second body 200. Accordingly, the first body 100, the second body 200, and the plating layer 340 may be connected to one another.

In detail, the plating layer 340 may be formed to correspond to the upper and lower surfaces of the substrate 300. The first plating layer 341 being formed on the upper surface of the substrate 300 may be in contact with the lower surface of the first body 100. The first plating layer 341 being formed on the upper surface of the substrate 300 may be disposed to face the second protruded part 136 in an optical axis direction. The first plating layer 341 being formed on the upper surface of the substrate 300 may be in contact with the lower surface of the first ground part 140, that is, the lower surface of the plurality of protrusions 142.

The second plating layer 342 being formed on the lower surface of the substrate 300 may be in contact with the upper surface of the second body 200. The second plating layer 342 being formed on the upper surface of the substrate 300 may be disposed to face the third groove 240 in an optical axis direction. The second plating layer 342 being formed on the upper surface of the substrate 300 may be in contact with the upper surface of the second ground part 240.

The first plating layer 341 and the second plating layer 342 may be connected to each other. The first plating layer 341 and the second plating layer 342 may be connected to each other through a connection part 344.

For example, the connection part 344 may be formed on the side surface of the substrate 300 to connect the first plating layer 341 and the second plating layer 342 to each other, as illustrated in FIG. 10.

Unlike this, the substrate 300 may include a hole 347 penetrating from the upper surface to the lower surface, and the connection part 344 is disposed along the inner surface of the hole 347 to connect the first plating layer 341 and the second plating layer 342 to each other.

The substrate 300 may include an avoidance portion 350. The avoidance portion 350 may be disposed in a corner area of the substrate 300. As illustrated in FIG. 8, the avoidance portion 350 is for the first guide 150 to penetrate and may be disposed in an area being overlapped with the first guide 150 and the second guide 250 in an optical axis direction. A portion of the side surface of the substrate 300 may be in contact with the outer surface of the guide wall 152 by the avoidance portion 350. The lower surface of the substrate 300 may be at the same height as the lower surface of the guide wall 152. The substrate 300 can be firmly fixed between the first body 100 and the second body 200 by the first guide 150, the second guide 250, and the avoidance portion 350.

The camera module 10 may include an adhesive 800. The adhesive 800 may be an area that is cured after application of a liquid adhesive. In more detail, the adhesive 800 may be an area where epoxy is hardened. The joint state of the first body 100 and the second body 200 can be firmly fixed by the adhesive 800.

An adhesive 800 may be disposed between the first body 100 and the second body 200. The adhesive 800 may be disposed between the first edge area 170 and the second edge area 270. As previously described, at least a portion of the first edge area 170 and the second edge area 270 may be spaced apart in the optical axis direction, and an adhesive 800 may be disposed in the area being spaced apart.

In more detail, an adhesive 800 can be disposed: between the lower surface of the first protruded part 130 and the bottom surface of the second groove 230; between the bottom surface of the first groove 138 and the third protruded part 210; between the first ground part 140 and the substrate 300; and between the second ground part 240 and the substrate 300.

Meanwhile, as previously described, the first ground part 140 or the second ground part 240 may include a plurality of protrusions 142, and the adhesive 800 is introduced in and cured between the plurality of protrusions 142 to firmly fix the coupling state of the first body 100, the second body 200, and the substrate 300. Accordingly, the adhesive 800 may also be disposed on the side surface of the substrate 300 and the upper surface of the substrate 300 being disposed on the gap. Meanwhile, as previously described, a plurality of protrusions 142 may be included in the first ground part 140 or the second ground part 240, and the adhesive 800 is introduced in and cured between the plurality of protrusions 142 to firmly fix the coupling state of the first body 100, the second body 200, and the substrate 300. Accordingly, the adhesive 800 may be disposed on the side surface of the substrate 300 and the upper surface of the substrate 300 being disposed on the gap.

According to the above structure, the first body 100, the second body 200, and the printed circuit board 300 are electrically connected to form a ground area, thereby preventing the electromagnetic waves being generated in the circuit area of the printed circuit board from being radiated to the outside and affecting adjacent electronic components, or preventing the electromagnetic waves being generated externally from being introduced into the printed circuit board, so that the electrical characteristics of the camera module can be further improved, noise can be prevented from being included in the electrical signal, and excellent quality images can be obtained.

In addition, since the contact between the first ground part 140 and the second ground part 240 forms an area where the adhesive member (epoxy) 800 is disposed between the first body 100 and the second body 200, there is an advantage in that the manufacturing process of the camera module becomes facilitated.

Although embodiments of the present invention have been described above with reference to the attached drawings, those skilled in the art will understand that the present invention can be implemented in other specific forms without changing the technical idea or essential features. Therefore, the embodiments described above should be understood in all respects as illustrative and not restrictive.

The invention claimed is:

1. A camera module comprising:
- a first body including a first ground part;
- a second body including a second ground part;
- a substrate disposed between the first body and the second body and including a hole; and
- an adhesive for coupling the first body and the second body to each other,
- wherein the first ground part comes into contact with a first plating layer disposed on one surface of the substrate and the second ground part comes into contact with a second plating layer disposed on the other surface of the substrate,
- wherein the first ground part is electrically connected to the second ground part by a connection part connecting the first plating layer to the second plating layer through the hole of the substrate,
- wherein the first ground part includes a first unit ground plane a second unit ground plane, and a gap separating the first unit ground plane and the second unit ground plane and
- wherein the adhesive includes a portion disposed in the gap on an upper surface of the substrate and a portion that surrounds a side surface of the substrate.

2. The camera module according to claim 1,
- wherein the first body includes a groove, and
- wherein the second body includes a protruded part coupled to the groove.

3. The camera module according to claim 2,
- wherein the protruded part becomes smaller in thickness as it travels upward.

4. The camera module according to claim 2, wherein a width of the protruded part becomes smaller toward the end.

5. The camera module according to claim 1, wherein the connection part is disposed in the hole or on a side surface of the substrate so as to connect the first plating layer and the second plating layer.

6. The camera module according to claim 1, wherein the second ground part includes a plurality of protrusions being in contact with the lower surface of the substrate.

7. The camera module according to claim 1, wherein the first body includes a first guide being protruded downward, and wherein the second body includes a second guide being protruded upward and coupled to the first guide.

8. The camera module according to claim 7, wherein the first guide includes a guide wall being protruded from the lower surface of the first body and a guide groove being disposed inside the guide wall, and wherein the second guide is coupled to the guide groove.

9. The camera module according to claim 8, wherein the printed circuit board includes an avoidance part that in which the first guide or the second guide is disposed.

10. The camera module according to claim 1, wherein the first body and the second body are made of metal.

11. The camera module according to claim 1, wherein the gap includes a groove.

12. The camera module according to claim 1, wherein a number of first unit ground planes and a number of second unit ground planes are each N, and wherein a number of gaps is N−1.

13. A camera module comprising:
a first body;
a second body being coupled to the first body;
a substrate disposed between the first body and the second body; and
an adhesive that couples the first body and the second body,
wherein the first body includes a first ground part being electrically connected to the substrate,
wherein the first ground part includes a first unit ground plane, a second unit ground plane, and a gap separating the first unit ground plane and the second unit ground plane, and
wherein the adhesive includes a portion disposed in the gap on an upper surface of the substrate and a portion that surrounds a side surface of the substrate.

14. The camera module according to claim 13, wherein the gap includes a groove.

15. The camera module according to claim 13, wherein a number of first unit ground planes and a number of second unit ground planes are each N, and wherein a number of gaps is N−1.

* * * * *